United States Patent
Ko

(10) Patent No.: US 11,373,624 B2
(45) Date of Patent: Jun. 28, 2022

(54) VEHICULAR SCREEN CENTRAL CONTROL SYSTEM AND METHOD

(71) Applicants: FUDING PRECISION COMPONENTS (SHENZHEN) CO., LTD., Shenzhen (CN); FOXCONN INTERCONNECT TECHNOLOGY LIMITED, Grand Cayman (KY)

(72) Inventor: Chung-Nan Ko, New Taipei (TW)

(73) Assignees: FUDING PRECISION COMPONENTS (SHENZHEN) CO., LTD., Shenzhen (CN); FOXCONN INTERCONNECT TECHNOLOGY LIMITED, Grand Cayman (KY)

( * ) Notice: Subject to any disclaimer, the term of this patent is extended or adjusted under 35 U.S.C. 154(b) by 0 days.

(21) Appl. No.: 16/925,698

(22) Filed: Jul. 10, 2020

(65) Prior Publication Data

US 2021/0287629 A1    Sep. 16, 2021

(30) Foreign Application Priority Data

Mar. 16, 2020 (CN) .......................... 202010182991.5

(51) Int. Cl.
*G09G 5/14* (2006.01)
*G09G 5/10* (2006.01)
*B60K 37/02* (2006.01)

(52) U.S. Cl.
CPC .............. *G09G 5/14* (2013.01); *B60K 37/02* (2013.01); *G09G 5/10* (2013.01); *B60K 2370/52* (2019.05); *G09G 2320/0626* (2013.01); *G09G 2360/144* (2013.01); *G09G 2380/10* (2013.01)

(58) Field of Classification Search
CPC .... G09G 5/14; G09G 5/10; G09G 2320/0626; G09G 2360/144; G09G 2380/10; B60K 37/02; B60K 2370/52
See application file for complete search history.

(56) References Cited

U.S. PATENT DOCUMENTS

| | | | |
|---|---|---|---|
| 6,300,954 B1* | 10/2001 | Sato | G01J 4/04 349/187 |
| 2014/0253844 A1* | 9/2014 | Yamamoto | G02B 6/0056 349/64 |
| 2017/0124987 A1* | 5/2017 | Kim | B60R 11/04 |
| 2020/0125315 A1* | 4/2020 | Jung | G06F 1/3215 |
| 2021/0020141 A1* | 1/2021 | Yuasa | G06T 11/203 |

FOREIGN PATENT DOCUMENTS

| | | |
|---|---|---|
| CN | 205721729 U | 11/2016 |
| CN | 110858467 A | 3/2020 |
| TW | 201415343 A | 4/2014 |

* cited by examiner

*Primary Examiner* — Abbas I Abdulselam
(74) *Attorney, Agent, or Firm* — ScienBiziP, P.C.

(57) ABSTRACT

A vehicular screen central control system includes a processor, an information acquisition module communicatively coupled to the processor, a rotator communicatively coupled to the processor, and a display device coupled to the rotator. The display device includes a first display area and a second display area. The information acquisition module is configured to acquire a light intensity signal received by the display device. The processor is configured to control the display device to display and analyze the light intensity signal to transmit an instruction to the rotator. The rotator adjusts an angle between the first display area and the second display area according to the instruction.

9 Claims, 3 Drawing Sheets

VEHICULAR SCREEN CENTRAL CONTROL SYSTEM AND METHOD

FIELD

The subject matter herein generally relates to vehicular displays, and more particularly to a vehicular screen central control system and a method for controlling a display device.

BACKGROUND

Touch screens are increasingly popular in vehicles. However, the touch screen is embedded in a dashboard, and strong sunlight is easy to illuminate the screen, which causes reflection.

BRIEF DESCRIPTION OF THE DRAWINGS

Implementations of the present disclosure will now be described, by way of embodiments, with reference to the attached figures.

DETAILED DESCRIPTION

Figure 1:
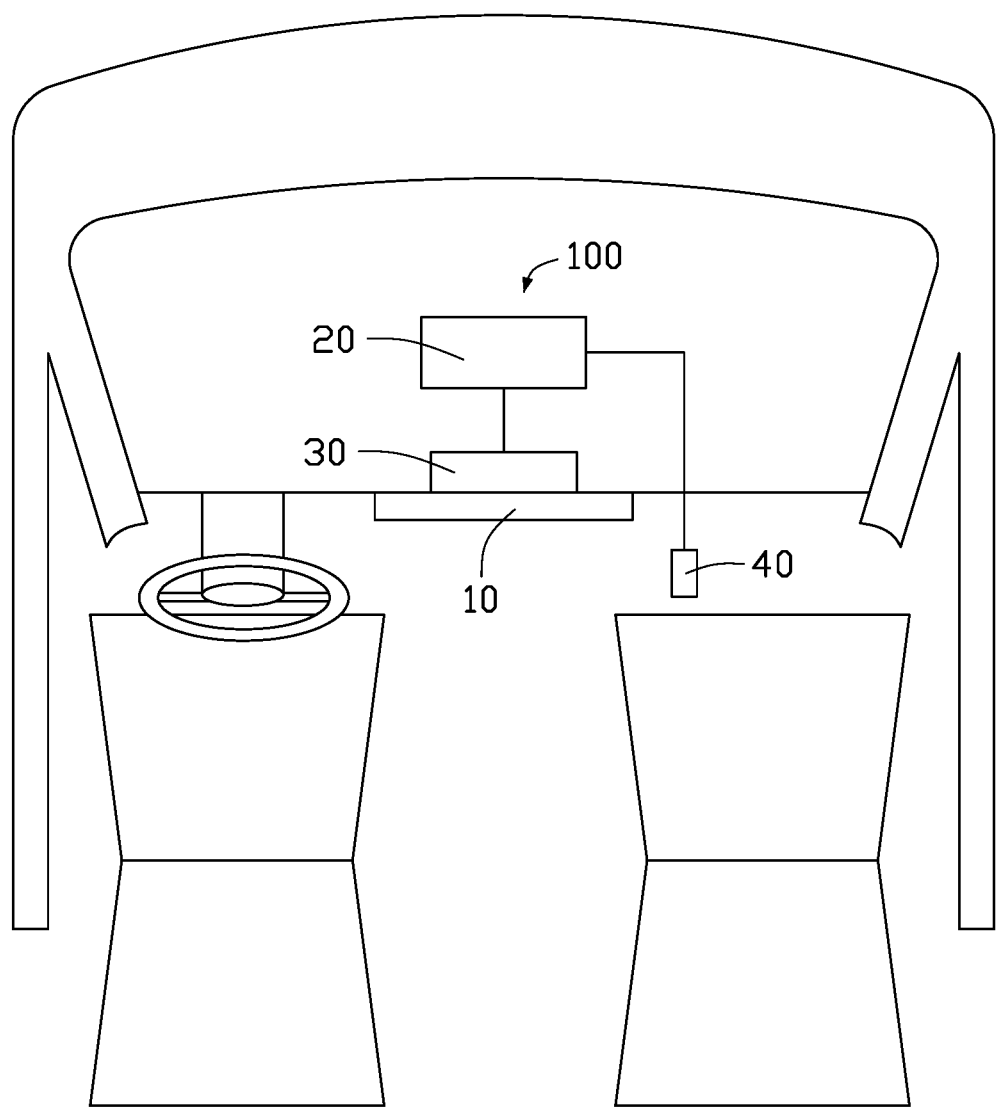
FIG. 1 is a schematic diagram of an embodiment of a vehicular screen central control system.

It will be appreciated that for simplicity and clarity of illustration, where appropriate, reference numerals have been repeated among the different figures to indicate corresponding or analogous elements. Additionally, numerous specific details are set forth in order to provide a thorough understanding of the embodiments described herein. However, it will be understood by those of ordinary skill in the art that the embodiments described herein can be practiced without these specific details. In other instances, methods, procedures and components have not been described in detail so as not to obscure the related relevant feature being described. The drawings are not necessarily to scale and the proportions of certain parts may be exaggerated to better illustrate details and features. The description is not to be considered as limiting the scope of the embodiments described herein.

Several definitions that apply throughout this disclosure will now be presented.

The term "coupled" is defined as connected, whether directly or indirectly through intervening components, and is not necessarily limited to physical connections. The connection can be such that the objects are permanently connected or releasably connected. The term "comprising" means "including, but not necessarily limited to"; it specifically indicates open-ended inclusion or membership in a so-described combination, group, series and the like.

Figure 2:
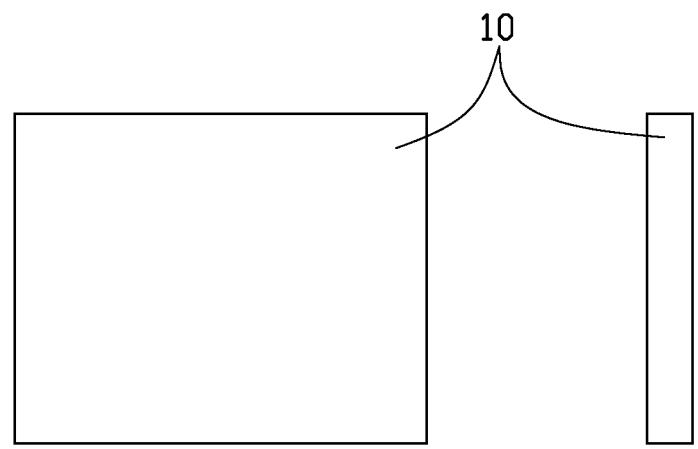
FIG. 2 is a schematic diagram of an embodiment of a display device of the vehicular screen central control system.
Figure 2:
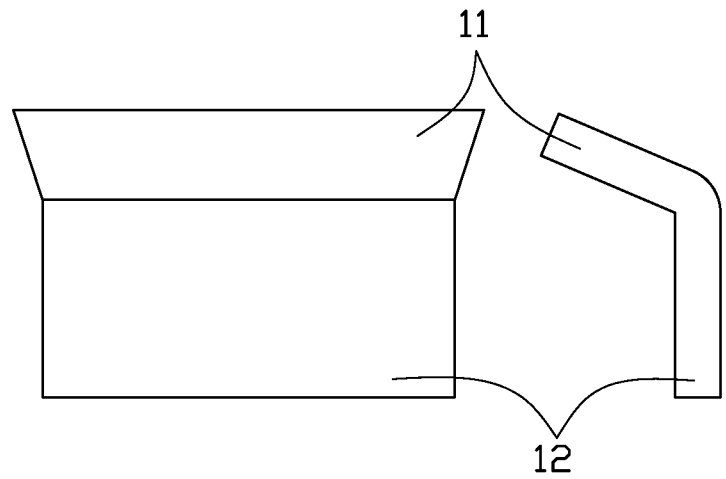

FIGS. 1-2 show an embodiment of a vehicular screen central control system 100 including a display device 10 and a processor 20. The display device 10 includes a first display area 11 and a second display area 12 connected together. The first display area 11 and the second display area 12 can be relatively rotated to fold the display device 10. The processor 20 controls a display of the first display area 11 and the second display area 12.

The vehicular screen central control system 100 further includes a rotator 30. The rotator 30 is connected to the processor 20 and the display device 10. The rotator 30 receives an instruction from the processor 20 and drives the first display area 11 and/or the second display area 12 to rotate to fold the display device 10.

The vehicular screen central control system 100 further includes an information acquisition module 40. The information acquisition module 40 senses a light intensity signal received by the display device 10 and transmits the light intensity signal to the processor 20. The processor 20 analyzes the light intensity signal of the information acquisition module 40 and sends an instruction to the rotator 30. In one embodiment, the information acquisition module 40 is a photosensitive sensor.

In one embodiment, when the first display area 11 and the second display area 12 form a plane, the processor 20 controls the first display area 11 and the second display area 12 to cooperatively display a single interface. When the first display area 11 and the second display area 12 are in an angled state, the processor 20 controls one of the first display area 11 and the second display area 12 to display.

Referring to FIG. 2, in one embodiment, the first display area 11 is arranged above the second display area 12. The first display area 11 is connected to the rotator 30. When the light intensity signal is large, the rotator 30 adjusts the angle between the first display area 11 and the second display area 12 to fold down the first display area 11 to shield the second display area 12 from light, which is beneficial for use of the display device 10. In one embodiment, when the display device 10 is an integrated flexible display screen, an upper portion is the first display area 11 and a lower portion is the second display area 12.

Figure 3:
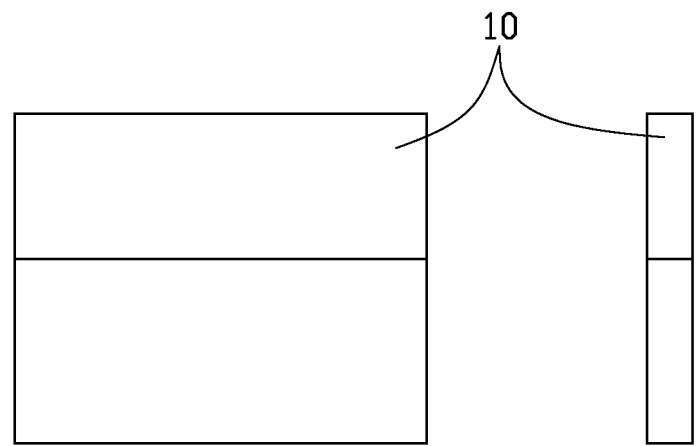
FIG. 3 is schematic diagram of another embodiment of the display device.
Figure 3:
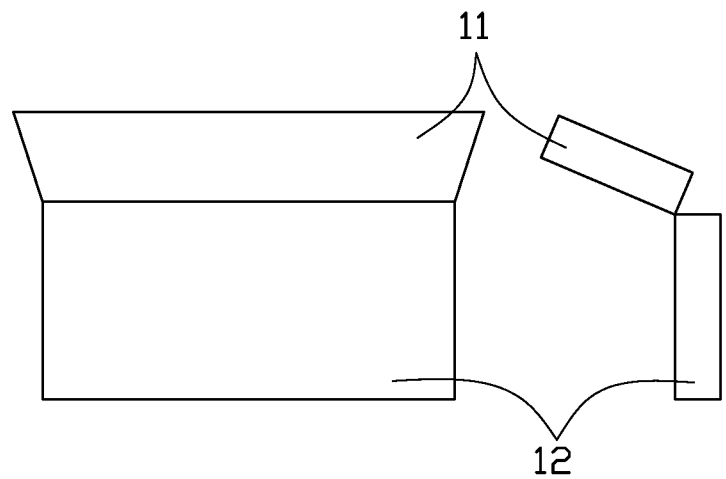

Referring to FIG. 3, in another embodiment, the display device 10 is formed by splicing the first display area 11 and the second display area 12 together.

The vehicular screen central control system 100 further includes a mode switching module (not shown). The mode switching module can switch an adjustment mode of the display device 10 between a manual mode and an automatic mode. In the automatic mode, the angle between the first display area 11 and the second display area 12 is adjusted according to the instructions of the processor 20. In the manual mode, the angle between the first display area 11 and the second display area 12 is adjusted manually.

A vehicular screen central control method for controlling the vehicular screen central control system 100 includes the following steps:

The information acquisition module 40 acquires the light intensity signal received by the display device 10;

The light intensity signal is transmitted to the processor 20;

The processor 20 analyzes the light intensity signal;

The processor 20 sends an instruction to the rotator 30; and

The rotator 30 adjusts the angle between the first display area 11 and the second display area 12 according to the instruction of the processor 20.

Specifically, when the light intensity signal detected by the information acquisition module 40 is higher than a first set value (in the case of strong light), the processor 20 sends an instruction to the rotator 30 to drive the first display area 11 to rotate, so that the second display area 12 is shaded to prevent reflection from the second display area 12, and the processor 20 turns off the first display area 11 and controls the second display area 12 for display.

When the light intensity signal detected by the information acquisition module 40 is lower than the first set value (in the case of low light), the processor 20 sends an instruction to the rotator 30 to rotate the first display area 11 so that the first display area 11 and the second display area 12 form a plane, and the processor 20 controls the first display area 11 and the second display area 12 to cooperatively display a single interface.

When the light intensity signal detected by the information acquisition module 40 is lower than a second set value (in the case of low light), the processor 20 controls the first display area 11 and/or the second display area 12 to increase a display brightness, and the first display area 11 can be rotated automatically or manually to illuminate different positions in the vehicle.

The control method of the vehicular screen central control system 100 further includes: when the display device 10 needs to be further adjusted, the mode switching module switches the automatic mode to the manual mode, so that the first display area 11 can be manually rotated.

It can be understood that the vehicular screen central control system 100 and the method of controlling the vehicular screen central control system 100 can be used in different kinds of vehicles. In other embodiments, the light intensity signal can be detected by other sensors. The first display area 11 and the second display area 12 can be arranged in a side-by-side arrangement. The display device 10 can also include a third display area rotationally connected to the first display area 11 or the second display area 12.

The embodiments shown and described above are only examples. Even though numerous characteristics and advantages of the present technology have been set forth in the foregoing description, together with details of the structure and function of the present disclosure, the disclosure is illustrative only, and changes may be made in the detail, including in matters of shape, size and arrangement of the parts within the principles of the present disclosure up to, and including, the full extent established by the broad general meaning of the terms used in the claims.

What is claimed is:

1. A vehicular screen central control system comprising:
   a processor;
   a photosensitive sensor communicatively coupled to the processor;
   a rotator communicatively coupled to the processor; and
   a display device coupled to the rotator, the display device comprising a first display area and a second display area, the first display area is arranged above the second display area;
   wherein:
   the photosensitive sensor is configured to acquire a light intensity signal received by the display device;
   the processor is configured to transmit an instruction to the rotator when the light intensity signal is higher than a first set value, the instruction controls the rotator to rotate the first display area so that the second display area is shaded by the first display area, and the processor is further configured to control the first display area to turn off and control the second display area to display.

2. The vehicular screen central control system of claim 1, wherein:
   the display device is rotated in a manual mode or an automatic mode;
   in the automatic mode, the angle between the first display area and the second display area is adjusted according to the instruction of the processor;
   in the manual mode, the angle between the first display area and the second display area is adjusted manually.

3. The vehicular screen central control system of claim 1, wherein:
   when the first display area and the second display area form a plane, the processor controls the first display area and the second display area to cooperatively display a same interface.

4. The vehicular screen central control system of claim 1, wherein:
   the display device is an integrated flexible display screen.

5. A vehicular screen central control method for controlling a vehicular screen central control system comprising a processor, a photosensitive sensor communicatively coupled to the processor, a rotator communicatively coupled to the processor, and a display device coupled to the rotator, the display device comprising a first display area and a second display area, wherein the method comprising:
   acquiring, by the photosensitive sensor, a light intensity signal received by the display device;
   transmitting, by the photosensitive sensor, a light intensity signal to the processor;
   analyzing, by the processor, whether the light intensity signal whether is higher than a first set value;
   sending, by the processor, an instruction to the rotator when the light intensity signal is higher than the first set value;
   rotating, by the rotator, the first display area so that the second display area is shaded by the first display area; and
   controlling, by the processor, the first display area to turn off and the second display area to display.

6. The vehicular screen central control method of claim 5, wherein:
   the display device is rotated in a manual mode or an automatic mode;
   in the automatic mode, the angle between the first display area and the second display area is adjusted according to the instruction of the processor;
   in the manual mode, the angle between the first display area and the second display area is adjusted manually.

7. The vehicular screen central control method of claim 6, wherein:
   when the first display area and the second display area form a plane, the first display area and the second display area are controlled to cooperatively display a same interface.

8. The vehicular screen central control method of claim 5, wherein:
   when the light intensity signal is lower than the first set value, the first display area is driven to rotate so that the first display area and the second display area form a plane, and the first display area and the second display area cooperatively display a single interface.

9. The vehicular screen central control method of claim 8, wherein:
   when the light intensity signal is lower than a second set value, display brightness of the first display area and/or the second display area is increased.

* * * * *